(12) United States Patent
Desrochers

(10) Patent No.: US 6,244,418 B1
(45) Date of Patent: Jun. 12, 2001

(54) CONVEYER ATTACHMENT

(75) Inventor: Emile Desrochers, Notre Dame de Lourdes (CA)

(73) Assignee: Demaco Enterprises Ltd., Notre Dame de Lourdes (CA)

( * ) Notice: Subject to any disclaimer, the term of this patent is extended or adjusted under 35 U.S.C. 154(b) by 0 days.

(21) Appl. No.: 09/317,218

(22) Filed: May 24, 1999

(51) Int. Cl.⁷ .................................................. B60P 1/36
(52) U.S. Cl. ....................................... 198/316.1; 198/318
(58) Field of Search ................................ 198/311, 316.1, 198/318

(56) References Cited

U.S. PATENT DOCUMENTS 2,584,322 * 2/1952 Baldwin et al. ..................... 198/311
3,863,783 * 2/1975 Spellman, Jr. ................... 198/311 X

* cited by examiner

Primary Examiner—Janice L. Krizek
(74) Attorney, Agent, or Firm—Adrian D. Battison

(57) ABSTRACT

An apparatus is provided for mounting a conveyer onto a skid steer loader. The apparatus includes a first mounting element arranged to mount on the loader's lift arms. A first frame extends from the first mounting element for pivotally mounting a second frame thereon such that the second frame is pivotal about an axis extending in the direction of the loader's travel. A second mounting element mounts the elongate housing of the conveyer onto the second frame such that the conveyer extends perpendicularly to the direction of the loader's travel. A hydraulic piston cylinder is mounted between the first and second frames for controlling pivotal displacement of the second frame and conveyer mounted thereon about the axis extending in the direction of the loader's travel. The lift arms on the loader control the height of the conveyer relative to the ground.

16 Claims, 3 Drawing Sheets

CONVEYER ATTACHMENT

FIELD OF THE INVENTION

This invention relates to a conveyer attachment for a loader and more particularly to an apparatus for mounting a conveyer onto the lift arms of a loader.

BACKGROUND

When forming concrete structures, conveyers are often used for handling concrete and pouring the concrete into forms. Conveyers elevate the fresh concrete but are generally used at a fixed location as they are awkward to move. When concrete is to be delivered to various positions along a concrete structure, such as a wall, the use of a pump is generally required. The use of pumps for pouring concrete however is very expensive.

SUMMARY

According to one aspect of the present invention there is provided an apparatus for mounting a conveyer onto a loader's lift arms, said apparatus comprising:

a first mounting element arranged to mount on the loader's lift arms;

a first frame mounted on the first mounting element;

a second frame pivotally mounted on the first frame about an axis extending in a direction of the loader's travel;

a second mounting element mounting the conveyer on the second frame such that the conveyer extends transversely to a direction of the vehicle's travel for pivotal movement about the axis; and an actuator for controlling pivotal movement of the conveyer.

The first mounting element preferably comprises a rectangular plate adapted to mount on the loader's lift arms.

A pair of flanges preferably extend upward from respective sides of the second frame for engaging respective sides of the conveyer.

A locking member may be connected between the first and second frames for restricting any relative movement therebetween. The locking member preferably comprise an elongate bar arranged to extend through co-operating apertures in the first and second frames when the first and second frames are adjacent each other and the second frame is generally horizontal.

The actuator preferably comprises a hydraulic piston cylinder mounted at a cylinder end on the first frame and mounted at a piston end on the second frame, the hydraulic piston cylinder being connected to the vehicle's hydraulics.

According to a further aspect of the present invention, the apparatus for mounting a conveyer is provided in combination with a conveyer for mounting the conveyer on a loader's lift arms.

There may be provided a pair of wheels mounted on the first end of the conveyer, the wheels being arranged to engage the ground for supporting the first end of the conveyer on the ground. Preferably there is provided a swivel mount for mounting each wheel on the conveyer such that the first end of the conveyer is supported on the ground for movement in any direction with the loader.

A second pair of wheels is preferably mounted towards the second end of the conveyer for supporting the second end of the conveyer on the ground when the first mounting element is disconnected from the loader.

BRIEF DESCRIPTION OF THE DRAWINGS

In the accompanying drawings, which illustrate an exemplary embodiment of the present invention.

DETAILED DESCRIPTION

Figure 1:
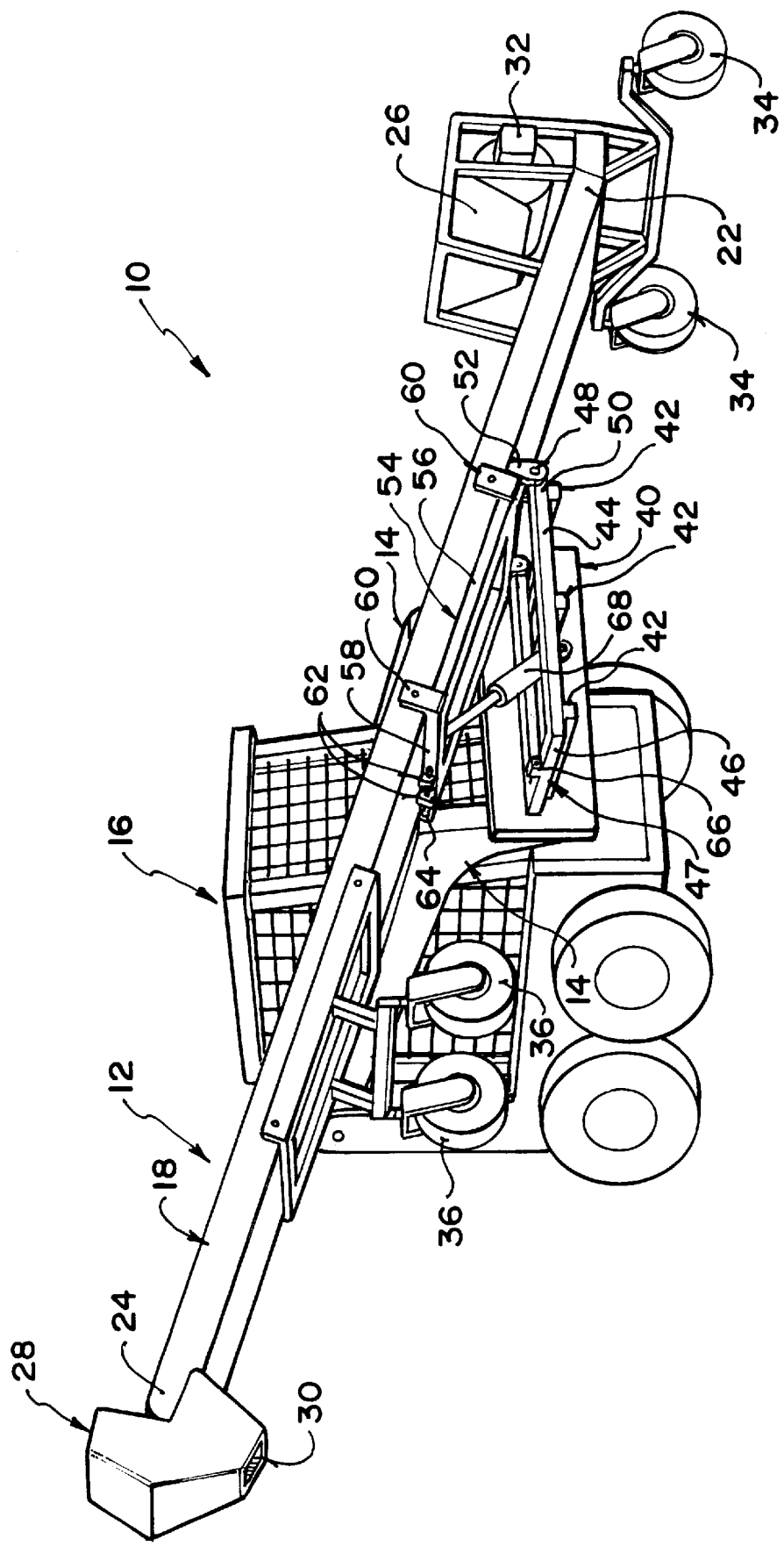
FIG. 1 is an isometric view of the conveyer mounted on a skid steer loader.

Referring to the accompanying drawings, there is illustrated an apparatus 10 arranged to mount a conveyer 12 onto the lift arms 14 of a loader 16.

The conveyer 12 has an elongate housing 18 having a belt mounted therein for conveying concrete from a first end 22 to a second end 24. A first hopper 26 is mounted above the first end of the conveyer for depositing concrete onto the belt. A second hopper 28 is mounted on the second end of the conveyer for collecting the concrete from the belt and depositing the concrete through an output 30. A drive system 32 is mounted on the first end for driving the belt within the housing.

When the conveyer is not mounted on the loader 16 it is supported at the first end by a first pair of spaced apart wheels 34 mounted on a wheel support frame extending from the first end of the housing. The conveyer is supported at a second end by a second pair of spaced apart wheels 36 mounted on a wheel support frame extending from the housing towards the second end. The second wheels 36 support the second end of the housing such that the housing extends horizontally spaced upwardly from the ground. The first and second wheels 34 and 36 are mounted on swivel mounts supporting the conveyer on the ground for displacement in any direction.

The apparatus 10 allows the conveyer to be mounted on the loader's lift arms 14 for raising the housing and controls an upward incline of the housing from the first end to the second end.

The apparatus 10 includes a mounting plate 40 which is adapted to mount on the loader's lift arms. The mounting plate 40 is a standard implement mounting plate for use with conventional skid steer loaders. The mounting plate 40 is generally rectangular having a plurality of apertures therein for fastening the plate to the lift arms 14 such that the plate lies in a plane extending perpendicularly to a direction 41 of the loader's travel.

Three parallel and spaced apart support arms 42 extend laterally outward, perpendicularly to the mounting plate 40. The support arms 42 mount a first pair of rails 44 thereon to extend perpendicularly to the arms. The first rails 44 include a pair of cross members 46 connected between respective ends of the rails such that the rails are parallel and spaced apart to form a first frame 47.

A pair of pivots 48 are mounted at a first end 50 of the first frame. The pivots are spaced apart and arranged for pivotal motion about an axis extending in the direction 41 of the loader's travel. A first end 52 of a second frame 54 pivotally mounts on the pivots on the first frame.

The second frame 52 includes a second pair of rails 56 mounted on the respective pivots 48 and a pair of cross members 58 connected between respective ends of the rails. A pair of spaced apart flanges 60 extend upward from each side of the second frame for engaging respective sides of the conveyer housing. Fasteners secure the flanges 60 to the conveyer housing.

The second frame 52 supports the conveyer housing 18 thereon such that the conveyer housing extends perpendicularly to the direction of the vehicle's travel. The conveyer is thus pivotal with the second frame about the axis extending in the direction of the vehicle's travel.

A pair of guides 62 are mounted on a second end of the second frame 52 opposite the pivots, for slidably receiving a locking member 64 therethrough. A lug 66 having an aperture therein is mounted on a second end of the first frame 47 for receiving the locking member therein when the housing is in a horizontal position. In the horizontal position the first and second frames are adjacent each other.

The inclination of the second frame and conveyer housing mounted thereon in relation to the first frame is controlled by a hydraulic piston cylinder 68. The hydraulic cylinder 68 mounts at a cylinder end on a middle one of the support arms 42 and extends upward to mount at a piston end on one of the cross members 58 at the second end of the second frame. Extension and contraction of the cylinder will pivot the second frame and conveyer housing mounted thereon about the first frame. The hydraulic piston cylinder 68 is connected to the loader's existing hydraulic systems.

Figure 2:
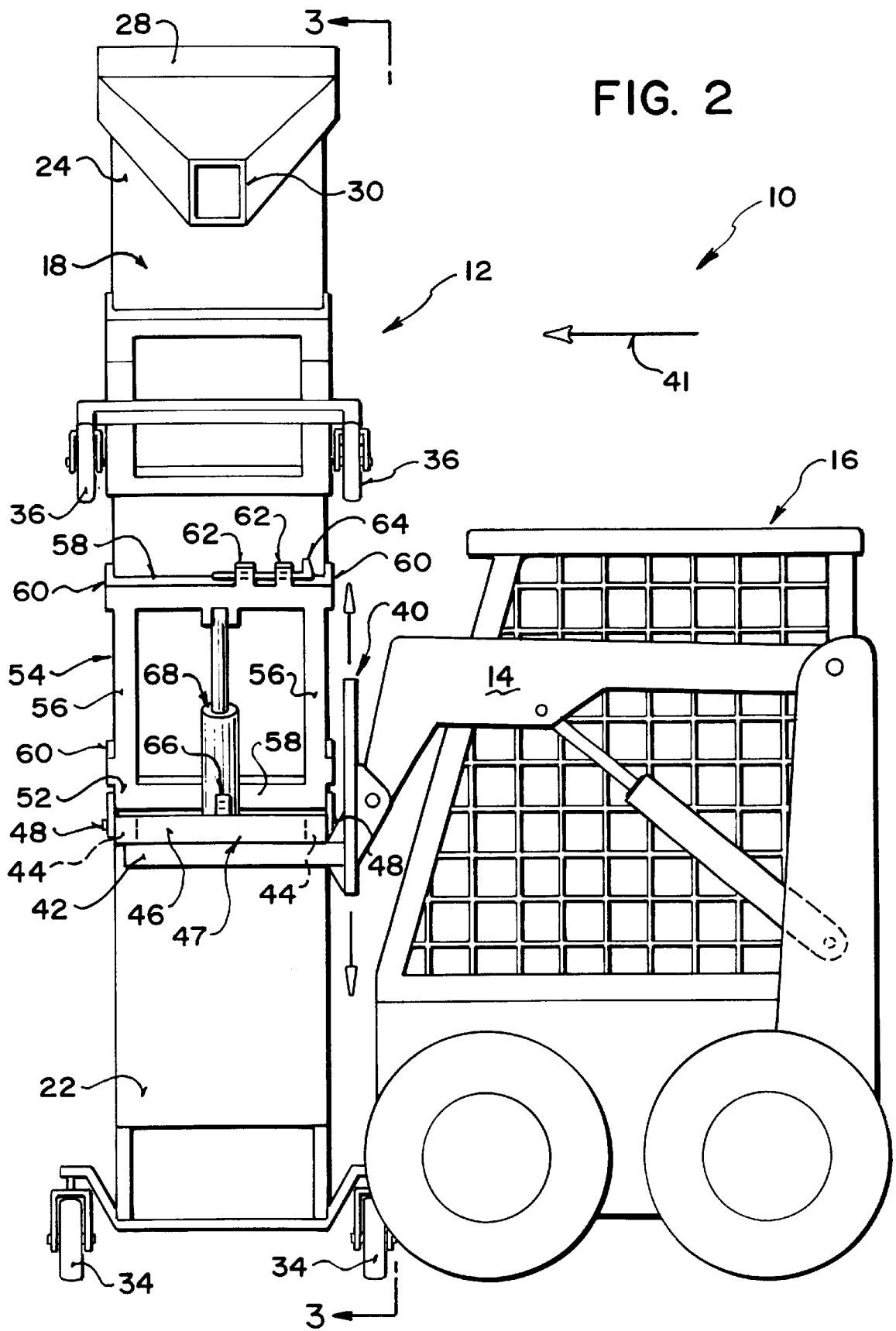
FIG. 2 is an elevational view of an end of the conveyer.
Figure 3:
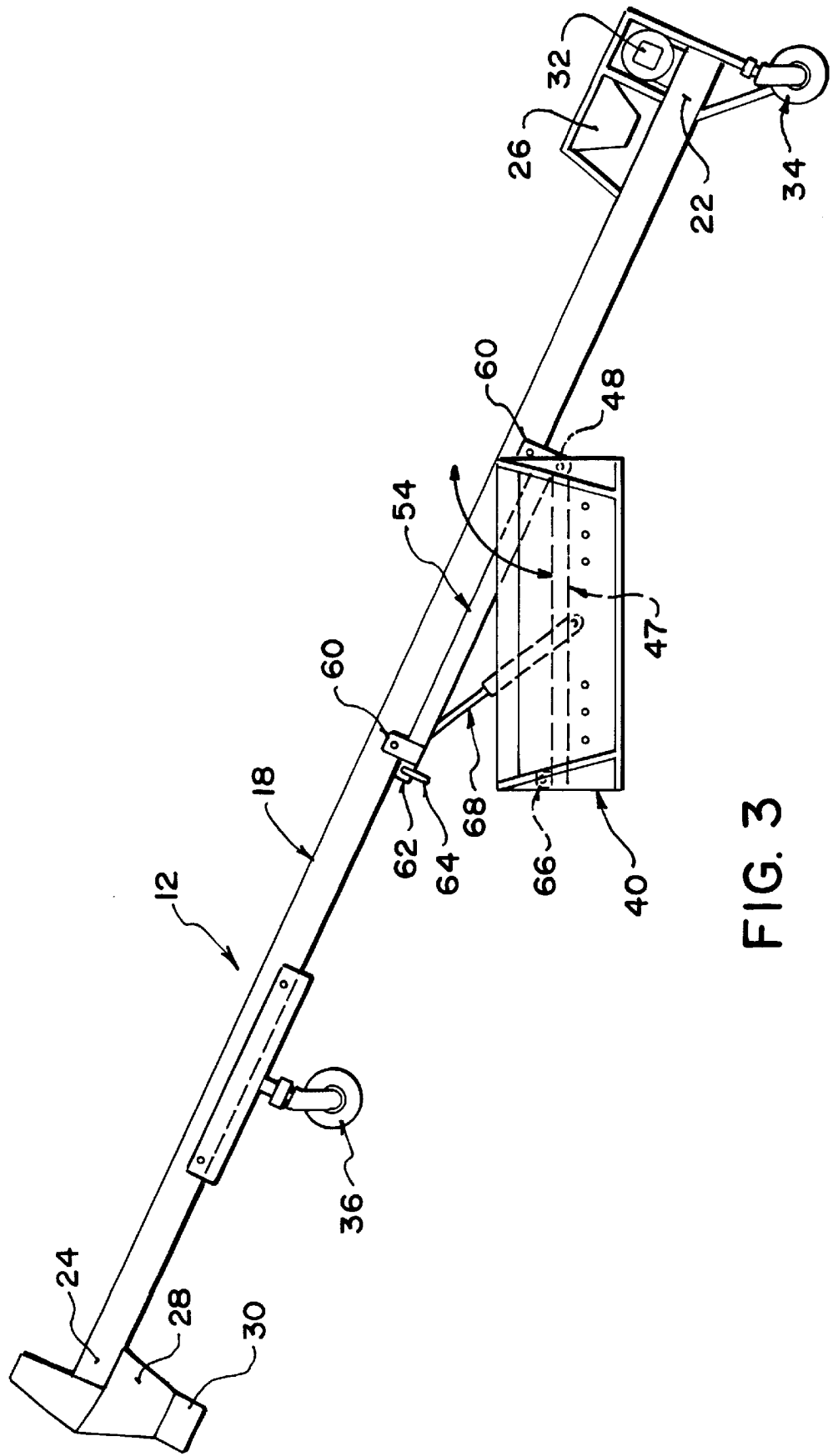
FIG. 3 is a side elevational view along the line 3—3 of FIG. 3.

In use, the conveyer may be positioned at any desired height by raising and lowering the lift arms on the loader as shown in FIG. 2. The inclination of the housing may then be adjusted using the hydraulic piston cylinder such that the wheels at the first end of the conveyer housing engage the ground. Once the desired height and inclination of the housing have been set the loader is able to move forward while the output of the second hopper follows along the top of a form for a concrete wall for example.

While one embodiment of the present invention has been described in the foregoing, it is to be understood that other embodiments are possible within the scope of the invention. The invention is to be considered limited solely by the scope of the appended claims.

What is claimed is:

1. A conveyer in combination with a loader supported for movement across the around in a working direction and having lift arms pivotally mounted thereon for upward and downward movement relative to the loader, the conveyer mounted on an elongate housing for conveying material from a first end to a second end of the housing and including an apparatus arranged to support the conveyer on the lift arms of the loader, said apparatus comprising:
    a first mounting element mounted on the lift arms of the loader;
    a first frame mounted on the first mounting element;
    a second frame pivotally mounted on the first frame about an axis extending in the working direction of the loader;
    a second mounting element mounting the housing of the conveyer on the second frame such that the housing extends transversely to the working direction for pivotal movement about the axis extending in the working direction; and
    an actuator for controlling pivotal movement of the conveyer relative to the loader.

2. The apparatus according to claim 1 wherein the first mounting element comprises a rectangular plate mounted on the lift arms of the loader.

3. The apparatus according to claim 1 wherein there is provided a pair of flanges extending upward from respective sides of the second frame fastened to respective sides of the conveyer.

4. The apparatus according to claim 1 wherein there is provided a locking member connected between the first and second frames for restricting relative movement therebetween.

5. The apparatus according to claim 4 wherein the locking member is arranged to extend through co-operating apertures in the first and second frames when the first and second frames are adjacent each other and the second frame is generally horizontal.

6. The apparatus according to claim 1 wherein the actuator comprises a hydraulic piston cylinder mounted at a cylinder end on the first frame and mounted at a piston end on the second frame.

7. The combination according to claim 1 wherein the loader comprises a skid steer loader.

8. The combination according to claim 1 wherein the first mounting element is secured to the lift arms of the loader with fasteners so as to be selectively separable therefrom.

9. A conveyer mounted on lift arms of a loader arranged to be displaced across the ground in a working direction, said conveyer comprising:
    an elongate housing;
    conveyer means within the elongate housing for conveying material from a first end to a second end of the housing;
    a pair of wheels mounted on the first end of the housing, the wheels being arranged to engage the ground for supporting the first end of the housing on the ground;
    a first mounting element mounted on the lift arms of the loader;
    a frame mounted on the first mounting element;
    a second mounting element pivotally mounting the housing onto the frame such that the housing extends transversely to the working direction for pivotal movement of the housing about an axis extending in the working direction; and
    an actuator for controlling pivotal displacement of the housing relative to the frame.

10. The conveyer according to claim 9 wherein there is provided a swivel mount mounting each wheel on the housing such that the first end of the housing is supported on the ground for movement in any direction with the loader.

11. The conveyer according to claim 9 wherein there is provided a second pair of wheels mounted adjacent the second end of the housing for supporting the second end of the housing on the ground when the first mounting element is disconnected from the loader.

12. The conveyer according to claim 9 wherein the first mounting element comprises a rectangular plate adapted to mount on the loader's lift arms.

13. The conveyer according to claim 9 wherein the actuator comprises a hydraulic piston cylinder for pivoting the housing relative to the frame.

14. The conveyer according to claim 9 wherein there is provided an inlet hopper mounted at the first end of the housing and a discharge hopper mounted at the second end of the housing.

15. The conveyer according to claim 9 wherein the actuator is mounted directly between the frame and the second mounting element.

16. A conveyer in combination with a loader supported for movement across the ground in a working direction and having lift arms pivotally mounted thereon for upward and downward movement relative to the loader, the conveyer being mounted on an elongate housing for conveying material from a first end to a second end of the housing and including an apparatus arranged to support the conveyer on the lift arms of the loader, said apparatus comprising:
    a first mounting element mounted on the lift arms of the loader;

a first frame mounted on the first mounting element;

a second frame pivotally mounted on the first frame about an axis extending in the working direction of the loader;

a second mounting element mounting the housing of the conveyer on the second frame such that the housing extends transversely to the working direction for pivotal movement about the axis extending in the working direction; and an actuator extending between the first frame and the second frame and being mounted at respective ends on the first and second frames respectively for controlling pivotal movement of the conveyer relative to the loader;

the first and second frames and the actuator mounted therebetween being movable together for upward and downward movement with the lift arms relative to the loader.

* * * * *